(12) United States Patent
Hecht (10) Patent No.: US 7,073,987 B2
(45) Date of Patent: Jul. 11, 2006

(54) TANGENTIAL CUTTING INSERT AND INSERT HOLDER

(75) Inventor: Gil Hecht, Nahariya (IL)

(73) Assignee: Iscar Ltd., Tefen (IL)

( * ) Notice: Subject to any disclaimer, the term of this patent is extended or adjusted under 35 U.S.C. 154(b) by 208 days.

(21) Appl. No.: 10/375,112

(22) Filed: Feb. 28, 2003

(65) Prior Publication Data

US 2003/0170080 A1    Sep. 11, 2003

(30) Foreign Application Priority Data

Mar. 6, 2002 (IL) ........................ 148535

(51) Int. Cl.
B23B 27/16 (2006.01)

(52) U.S. Cl. ..................... 407/113; 407/103

(58) Field of Classification Search ............. 407/113, 407/114, 115, 102, 103, 104, 101
See application file for complete search history.

(56) References Cited

U.S. PATENT DOCUMENTS

| | | | | |
|---|---|---|---|---|
| 3,142,110 A | | 7/1964 | Hertel | ............ 29/96 |
| 3,490,117 A | | 1/1970 | Hertel | ............ 29/96 |
| 3,694,876 A | * | 10/1972 | Erkfritz | .......... 407/48 |
| 3,813,747 A | * | 6/1974 | Hertel | ........... 407/105 |
| 4,074,949 A | * | 2/1978 | Hochmuth et al. | ...... 407/114 |
| 4,294,566 A | * | 10/1981 | Boone | .......... 407/114 |
| 4,632,608 A | | 12/1986 | Blomberg et al. | ...... 407/114 |
| 5,333,972 A | * | 8/1994 | Bernadic et al. | ......... 407/113 |
| 6,074,137 A | | 6/2000 | Betman et al. | ........ 407/103 |
| 6,196,770 B1 | * | 3/2001 | Astrom et al. | .......... 407/40 |
| 6,343,898 B1 | * | 2/2002 | Sjoo et al. | ........... 407/101 |
| 6,543,970 B1 | * | 4/2003 | Qvarth et al. | ......... 407/114 |
| 6,872,034 B1 | * | 3/2005 | Satran et al. | ......... 407/113 |
| 6,921,233 B1 | * | 7/2005 | Duerr et al. | ........... 407/34 |

FOREIGN PATENT DOCUMENTS

WO    WO 97/17157    5/1997

* cited by examiner

Primary Examiner—Boyer D. Ashley
Assistant Examiner—Sara Addisu
(74) Attorney, Agent, or Firm—Womble Carlyle (57) ABSTRACT

A tangential indexable cutting insert can be used for metal cutting processes in general and for radial and axial turning of a stepped square shoulder in particular. The cutting insert exhibits 180° rotational symmetry about three mutually perpendicular axes. The cutting insert has generally "S"-shaped cutting edges extending between raised and lowered corners. The cutting edges and side surfaces are concave in an end view of the cutting insert. The cutting insert enables radial and axial turning operations of a square shoulder with unlimited depth of cut.

24 Claims, 12 Drawing Sheets

TANGENTIAL CUTTING INSERT AND INSERT HOLDER

FIELD OF THE INVENTION

The present invention relates to a tangential indexable cutting insert for use in metal cutting processes in general and for radial and axial turning of a stepped square shoulder in particular.

BACKGROUND OF THE INVENTION

Tangential cutting inserts, also known as on-edge, or lay down, cutting inserts, are oriented in an insert holder in such a manner that during a cutting operation on a workpiece the cutting forces are directed along a major (thicker) dimension of the cutting insert. An advantage of such an arrangement being that the cutting insert can withstand greater cutting forces than when oriented in such a manner that the cutting forces are directed along a minor (thinner) dimension of the cutting insert. Another advantage of such an arrangement is that with the minor dimension directed perpendicular to the cutting forces it is possible to manoeuvre the cutting insert between obstacles close to the workpiece.

For turning a stepped square shoulder on a workpiece, a cutting tool assembly requires a cutting insert with an acute operative insert cutting corner, a tool back clearance angle along its inoperative cutting edge and an obtuse entering angle along its operative cutting edge. Such an entering angle enables an outwardly directed feed out movement to square out a shoulder, in particular, an outwardly directed radial feed out movement in the case of external axial turning operations and an outwardly directed axial feed out movement in the case of radial turning operations.

In view of these restrictions, cutting inserts for turning stepped square shoulders are usually either rhomboidal or triangular; thereby having respectively, two or three indexable insert cutting corners for single-sided cutting inserts. Such cutting inserts are, for example, as illustrated and described in U.S. Pat. No. 4,632,608, each insert cutting corner being formed as a protruding nose portion at the junction between centrally depressed insert sides. The cutting inserts are preferably double sided so as to be respectively formed with four or six indexable insert cutting corners.

With a view to increasing the number of cutting corners, a fully indexable non-tangential cutting insert is described in U.S. Pat. No. 6,074,137. The cutting insert comprises four substantially concave side edges extending between substantially square opposing upper and lower surfaces. Adjacent side edges meet at a cutting corner having an angle in the range of about 83°±5°. Although the cutting insert is substantially square and although it offers eight cutting corners, its depth of cut is limited. In fact, the maximal depth of cut is limited to less than the length of a side of an imaginary square, in which the insert is inscribed, in a top view of the insert. Furthermore, it is not a tangential cutting insert.

Figure 1:
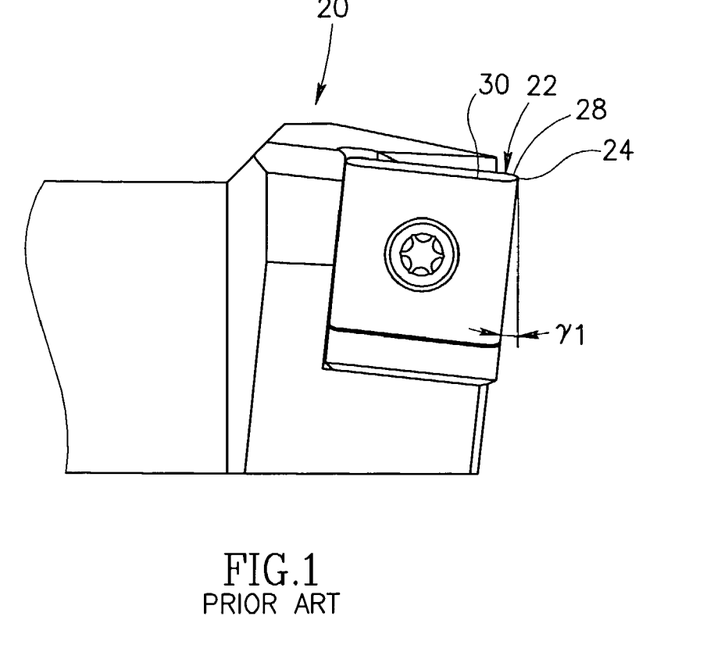
FIG. 1 is of a side view of a typical prior art cutting tool.
Figure 2:
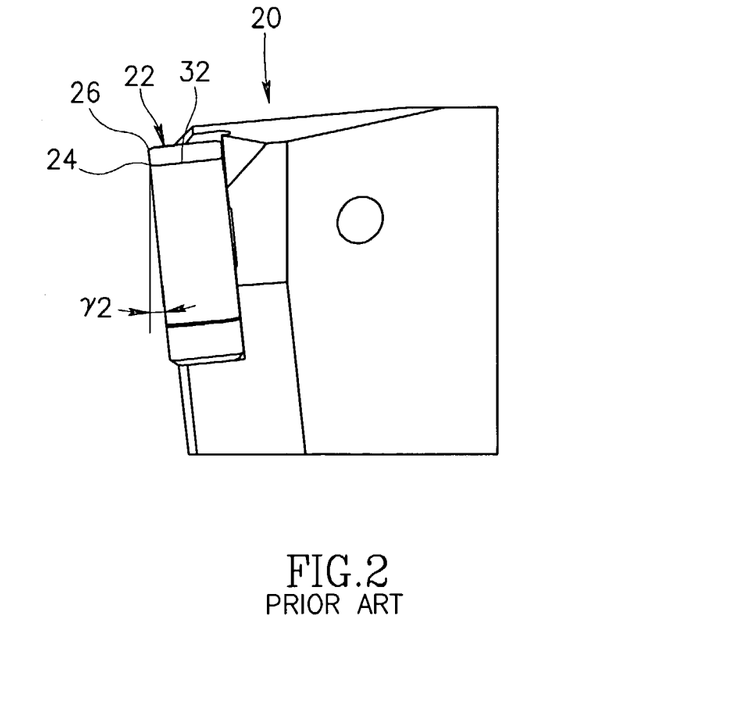
FIG. 2 is an end view of the cutting tool in FIG. 1.

FIGS. 1 and 2, show a cutting tool 20 with a tangentially seated cutting insert 22 for both axial and radial turning operations, also known as longitudinal and face turning operations. The cutting insert 22 is oriented with relief angles γ1 and γ2 for radial and axial turning operations, respectively. The cutting insert 22 has one operative cutting corner 24, a first trailing non-operative cutting corner 26 during axial turning operations and a second trailing non-operative cutting corner 28 during radial turning operations. Major and minor cutting edges 30, 32 extend between the operative cutting corner 24 and non-operative cutting corners 28, 26.

Figure 3:
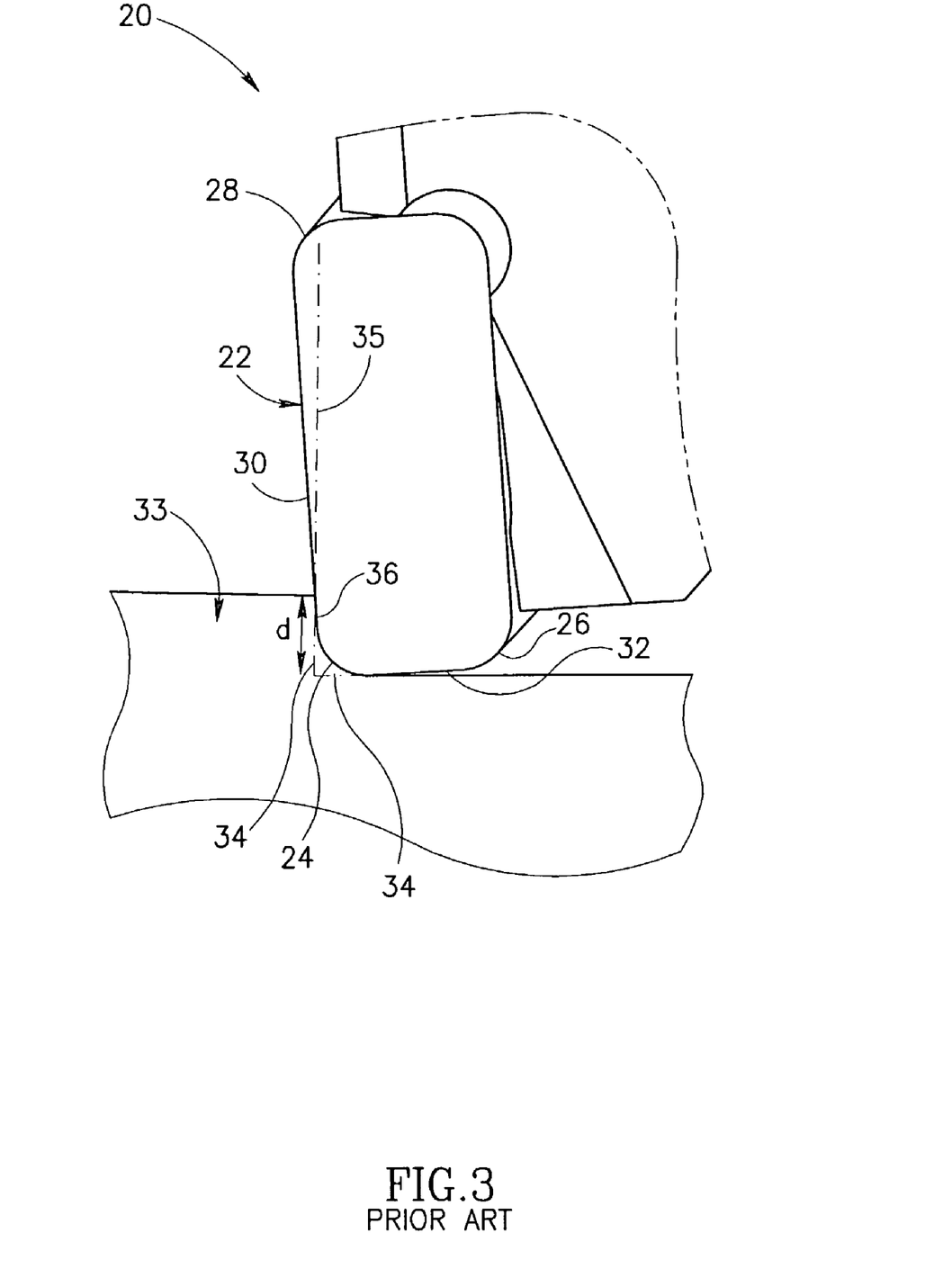
FIG. 3 is a plan view of the cutting tool in FIG. 1 in a turning operation.
Figure 4:
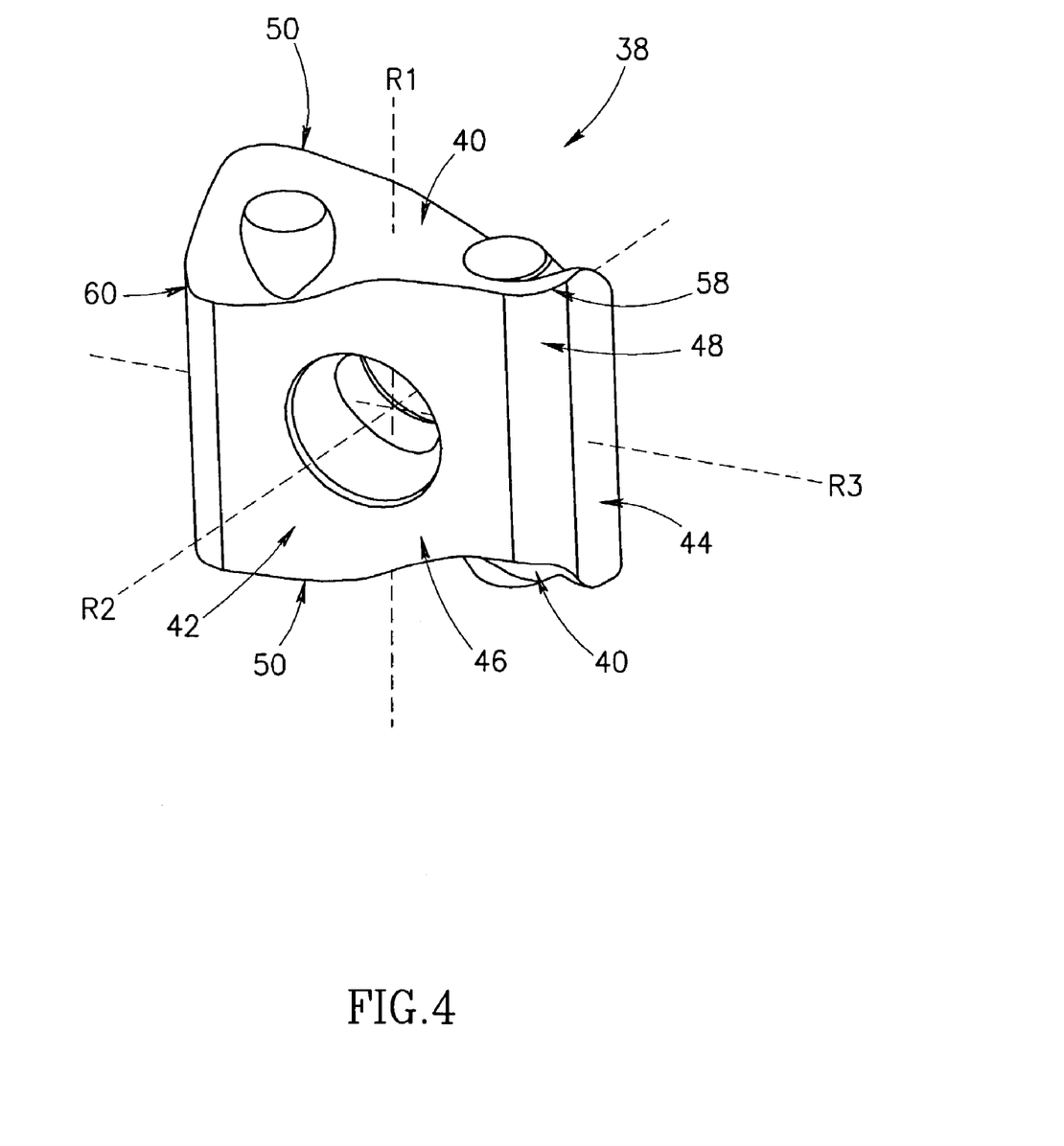
FIG. 4 is a perspective view of the cutting insert in accordance with the present invention.

FIG. 3 is an illustrative drawing showing the cutting tool 20 during either radial or axial turning operations of a workpiece 33. Dashed lines 34 show an ideal square shoulder and the dash-dot line 35 is an imaginary extension of the worked face 36 of the workpiece 33. As can be seen, for a radial turning operation, the second trailing non-operative cutting corner 28 and a portion of the major cutting edge 30 are oriented such that they "extend beyond" the imaginary extension 35 of the worked face 36 and would engage the workpiece 33 if an attempt were made to increase the depth of cut beyond a depth of cut, d, where the dashed line intersects the major cutting edge 30. Thus, the depth of cut is limited during radial turning of a square shoulder. For axial turning in the configuration shown in FIG. 3, the depth of cut is also limited to d. Any increase in the depth of cut would lead to a non-square shoulder. Similarly, the insert could be configured with an orientation such that for an axial turning operation, the first trailing non-operative cutting corner 26 and a portion of the minor cutting edge 32 are disposed such that they have a limited depth of cut. Likewise, the insert could be configured with an orientation so that it has a limited depth of cut for both axial and radial turning operations due both to the first trailing non-operative cutting corner 26 and a portion of the minor cutting edge 32 and also to the second trailing non-operative cutting corner 28 and a portion of the major cutting edge 30.

SUMMARY OF THE INVENTION

In accordance with the present invention there is provided an indexable cutting insert, for use in a cutting tool for turning operations, comprising:

two identical opposing end surfaces having 180° rotational symmetry about a first axis passing therethrough, a peripheral side surface extending between the two opposing end surfaces, and a peripheral edge formed at the intersection of each end surface and the peripheral side surface, at least two sections of each peripheral edge constituting cutting edges;

the peripheral side surface comprising:

two identical opposing major side surfaces having 180° rotational symmetry about a second axis passing therethrough, the second axis being perpendicular to the first axis;

two identical opposing minor side surfaces having 180° rotational symmetry about a third axis passing therethrough, the third axis being perpendicular to the first axis and the second axis;

a major plane defined by the first axis and the second axis;

a minor plane defined by the first axis and the third axis;

a median plane being defined by the second axis and the third axis;

each end surface having four corners, two lowered corners and two raised corners, the lowered corners being closer to the median plane than the raised corners;

in a side view of one of the minor side surfaces, all four corners are equidistant from the minor plane;

in a side view of one of the major side surfaces, all four corners are equidistant from the major plane.

In accordance with the present invention, the cutting insert has a maximum distance D1 between the minor side surfaces that is greater than a maximum distance D2 between the major side surfaces.

In accordance with the present invention, in an end view of the cutting insert, each major side surface is recessed.

In accordance with the preferred embodiment of the present invention, in an end view, the distance between the opposing major side surfaces varies from the maximum distance D2 adjacent the corners of the cutting insert to a minimum distance d2 at the intersection of the major side surfaces with the major plane.

In accordance with a specific application of the present invention, the minimum distance d2 is given by d2=D2−t, where the value t is given by 0.3 mm≦t≦0.4 mm.

In accordance with the present invention, in an end view of the cutting insert, each minor side surface is recessed.

In accordance with the preferred embodiment of the present invention, in an end view, the distance between the opposing minor side surfaces varies from the maximum distance D1 adjacent the corners of the cutting insert to a minimum distance d1 at the intersection of the minor side surfaces with the minor plane.

In accordance with a specific application of the present invention, the minimum distance d1 is given by d1=D1−s, where the value s is given by 0.05 mm≦s≦0.25 mm.

In accordance with the present invention, each minor side surface merges with an adjacent major side surface at a corner side surface, wherein each corner side surface extends between a given raised corner of one of the two opposing end surfaces and a given lowered corner of the other of one of the two opposing end surfaces.

In accordance with the preferred embodiment of the present invention, each cutting edge comprises a major edge, a minor edge and a corner edge, therebetween.

In accordance with the present invention, each major edge, corner edge, and minor edge is formed at the intersection of adjacent major side surface, corner side surface, and minor side surface, respectively with an adjacent end surface.

In accordance with the preferred embodiment of the present invention, the major edges are recessed in an end view.

In accordance with the preferred embodiment of the present invention, the distance between the opposing major edges varies from the maximum distance D2 adjacent the corner edges to the minimum distance d2 at the intersection of the major edges with the major plane.

In accordance with the preferred embodiment of the present invention, the minor edges are recessed in an end view.

In accordance with the preferred embodiment of the present invention, the distance between the opposing minor edges varies from the maximum distance D1 adjacent the corner edges to the minimum distance d1 at the intersection of the minor edges with the minor plane.

In accordance with the preferred embodiment of the invention, each raised corner forms a corner cutting edge and adjacent major and minor edges form major and minor cutting edges, respectively.

Generally, the major cutting edge has a length L1 that is greater than half the distance D1.

Generally, the minor cutting edge has a length L2 that is approximately half the distance D2.

In accordance with the preferred embodiment of the present invention, the cutting insert further comprises an insert through bore extending between the major side surfaces and having a bore axis coinciding with the second axis.

In accordance with the present invention there is provided a cutting tool comprising: the cutting insert in accordance with the present invention, a shim, and an insert holder having an insert pocket in which the shim and the cutting insert are securely retained.

In the cutting tool, the insert pocket comprises: a base surface, the base surface being abutted by a given major side surface of the cutting insert, a first side wall extending uprightly from the base surface, the first side wall being abutted by a given minor side surface of the cutting insert, and a second side wall extending uprightly from the base surface, the first side wall being adjacent the major side surface and transverse thereto;

the shim comprises a top surface that is abutted by a non-operative end surface of the cutting insert, an opposing bottom surface that abuts the first side wall, and a perimeter surface extending therebetween;

a shim screw, extending through the shim through bore and threadingly engaged with a threaded second bore of the second side wall, secures the shim to the insert pocket; and a securing screw, extending through the insert through bore, threadingly engaged with a threaded receiving bore of the base surface, secures the cutting insert to the insert pocket, the securing screw.

If desired, each end surface of the cutting insert further comprises two frustums extending away from the median plane located on either side of the major plane, and the top surface of the shim, in accordance with the present invention, further comprises a raised area being a portion of the top surface of the shim protruding from the top surface of the shim; wherein the two frustums of the non-operative end surface abut the raised area of the top surface of the shim.

BRIEF DESCRIPTION OF THE DRAWINGS

For a better understanding, the invention will now be described, by way of example only, with reference to the accompanying drawings in which.

DETAILED DESCRIPTION OF THE INVENTION

Attention is first drawn to FIGS. 4 to 8, showing a tangential indexable cutting insert 38 in accordance with present invention. The cutting insert 38 is generally manufactured by form pressing and sintering a cemented carbide, such as tungsten carbide, and can be coated or uncoated. The cutting insert 38 is generally rectangular in an end view and comprises two identical end surfaces 40, and a peripheral side surface 42 extending between the end surfaces 40. The cutting insert 38 and the end surfaces 40 have 180° rotational symmetry about a first axis R1 that passes through the end surfaces 40. Since the end surfaces 40 are identical, only one will be described, it being understood that the other end surface 40 has identical structure.

The peripheral side surface 42 comprises two opposed identical minor side surfaces 44, two opposed identical major side surfaces 46, and four opposed corner side surfaces 48. Adjacent major and minor side surfaces 46, 44 merge at a common corner side surface 48. The cutting insert 38 and the major side surface 46 have 180° rotational symmetry about a second axis R2 perpendicular to the first axis of rotational symmetry RI and passing through the major side surfaces 46. The cutting insert 38 and the minor side surface 44 also has 180° rotational symmetry about a third axis R3 that passes through the minor side surfaces 44 and is perpendicular to both the first and second axis of 180° rotational symmetry R1, R2.

The peripheral side surface 42 intersects each end surface 40 at a peripheral edge 50. The peripheral edge 50 comprises two identical opposed major edges 52, two identical opposed minor edges 54, and four opposed corner edges 56. Adjacent major and minor edges 52, 54 merge at a common corner edge 56. The major edges 52 are formed at the intersection of the major side surfaces 46 with the end surfaces 40, the minor edges 54 are formed at the intersection of the minor side surfaces 44 with the end surfaces 40, and the corner edges 56 are formed at the intersection of the corner side surfaces 48 with the end surfaces 40.

For further description of the geometrical properties of the cutting insert 38, a minor plane P1, to which the major edges 52 are generally parallel in an end view of the cutting insert 38, is defined by the first and third axis of rotational symmetry R1, R3. A major plane P2, to which the minor edges 54 are generally parallel in an end view of the cutting insert 38, is defined by the first and second axis of rotational symmetry R1, R2. A median plane M, which is perpendicular to both the first and major plane P1, P2, is defined by the second and third axis of rotational symmetry R2, R3. A width dimension D1 of the cutting insert 38 is defined as a maximum distance dimension between the minor side surfaces 44 measured parallel to the third axis R3. A length dimension D2 of the cutting insert 38 is defined as a maximum distance dimension between the major side surfaces 46 measured parallel to the second axis R2. For the tangential cutting insert 38, the width dimension D1 is greater than the length dimension D2.

Associated with each of the four corner edges 56 of a given end surface are four corners comprising two diametrically opposed raised corners 58 and two diametrically opposed lowered corners 60. The lowered corners 60 are closer to the median plane M than are the raised corners 58. In a side view of either of the minor side surfaces 44, all four corners 58, 60 are equidistant from the minor plane P1. In a side view of either of the major side surfaces 46, all four corners 58, 60 are equidistant from the major plane P2. Each corner side surfaces 48 extends between a given raised corner 58 of one end surface 40 and an adjacent lowered corner 60 on the opposing end surface 40. Each corner side surface 48 has uniform radius of curvature along its length, and typically forms an arc angle of 95°±3°. The alternating raised and lowered corners 58, 60 enable the cutting insert 38 to have four same-handed raised corners 58 for indexing.

Figure 5:
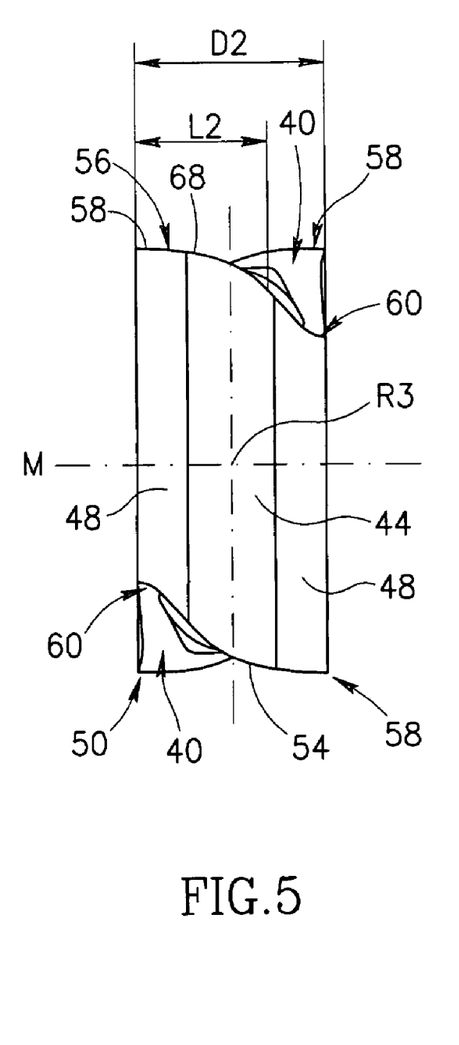
FIG. 5 is a first side view of the cutting insert in FIG. 4.
Figure 6:
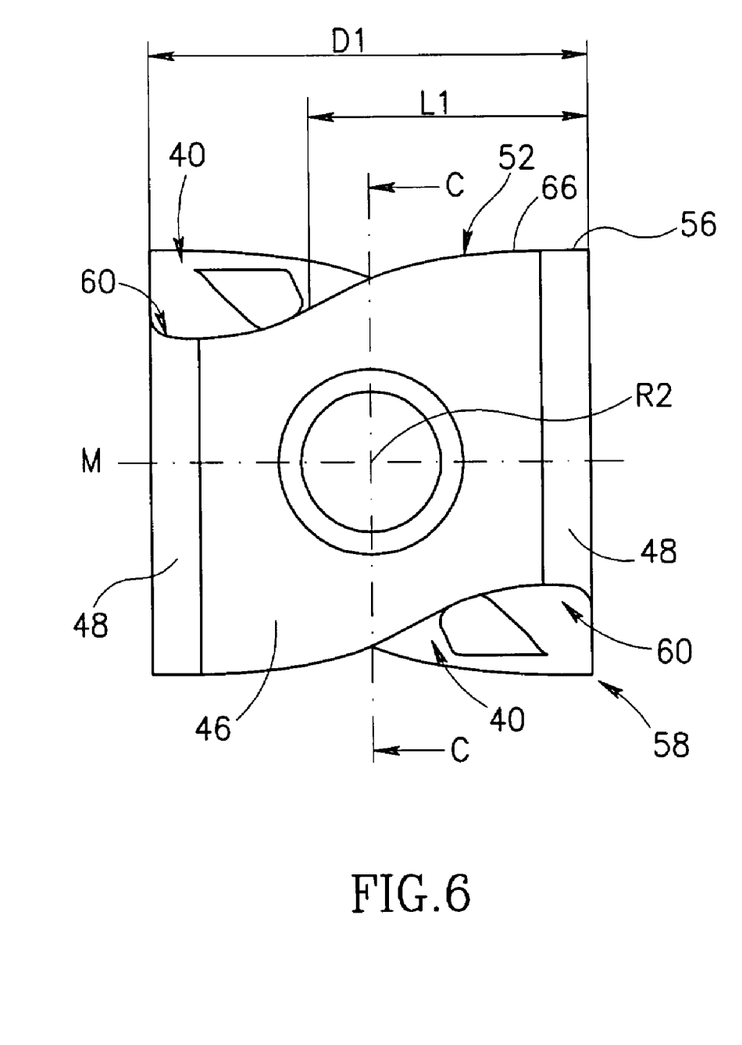
FIG. 6 is a second side view of the cutting insert shown in FIG. 4.
Figure 7:
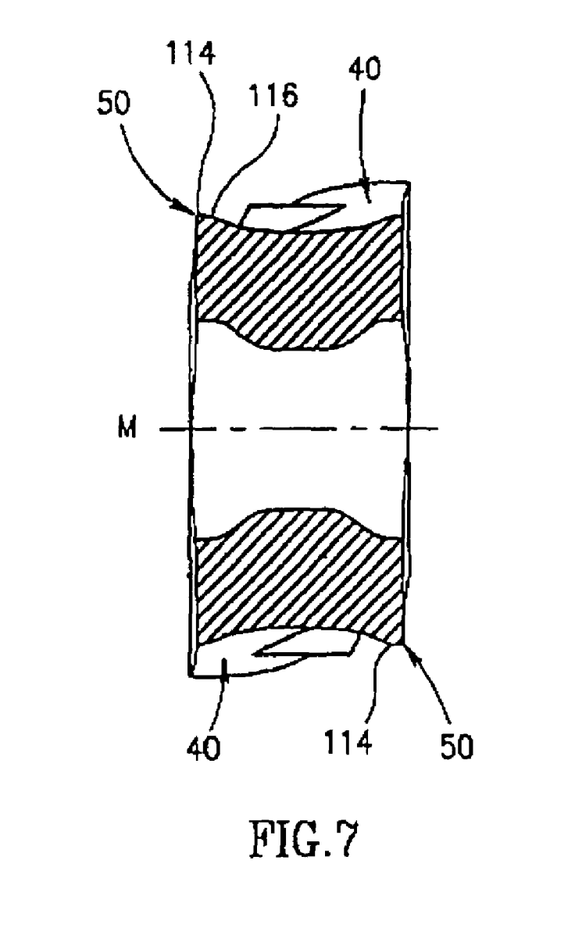
FIG. 7 is a cross-sectional view of the cutting insert shown in FIG. 6 taken along C—C.

Adjacent major and minor edges 52, 54 extend from the corner edge 56 of a given raised corner 58 with a variable slope to a respective lowered corner 60. In a side view of the cutting insert 38, adjacent each raised corner 58, the slope of each major edge 52 (see FIG. 6) is generally constant with the major edge 52 substantially parallel to the median plane M. Moving along the major edge 52 towards an adjacent lowered corner 60, the slope gradually increases and finally decreases adjacent the lowered corner 60. As can be seen in FIG. 5 each minor edge 54 has a generally similar form to that of the major edges 52. Thus in a respective side view, each major and minor edge 52, 54, has a similar wavy elongated "S"-shape.

Figure 8:
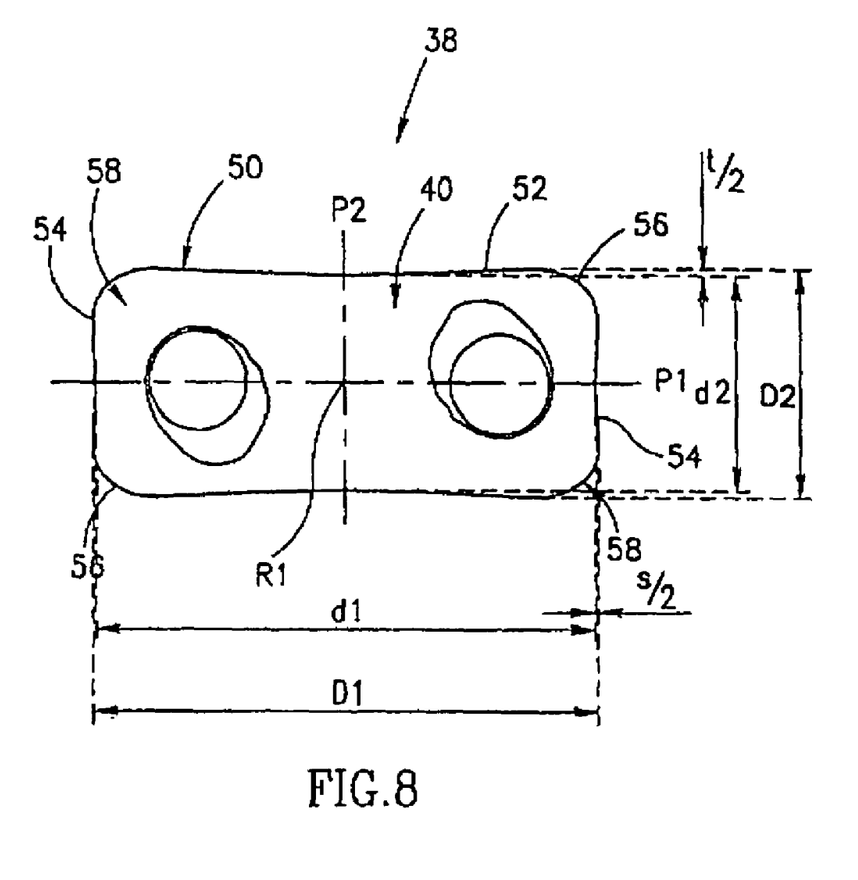
FIG. 8 is an end view of the cutting insert shown in FIG. 4.

In an end view of the cutting insert 38, the major edges 52 are concave. In other words, the major edges 52 are recessed in an end view wherein, the distance between the opposed major edges 52 varies from approximately D2 adjacent the corner edges 56 to a minimum distance d2 at the intersection of the major edges 52 with the major plane P2. The minimum distance d2 is defined by D2−t. In a non-binding example, t is greater than or equal to 0.3 mm and less than or equal 0.4 mm. In an end view of the cutting insert 38, each major side surface 46 is also concave, being recessed in the same manner as its associated major edge 52. It should be noted that the variation of the distance between the opposed major edges 52 (and likewise the opposed major side surfaces 46) need not decrease uniformly from the maximum value D2 to the minimum value d2.

In an end view of the cutting insert 38, the minor edges 54 are also concave, in a similar manner to the major edges 52. The distance between the opposed minor edges 54 in an end view, varies from approximately D1 adjacent the corner edges 56 to a minimum distance d1 at the intersection of the minor edges 54 with the minor plane P1. The minimum distance d1 is defined by D1−s. In a non-binding example, s is greater than or equal to 0.05 mm and less than or equal 0.25 mm. Likewise, in an end view of the cutting insert 38, each minor side surface 44 is concave, being recessed in the same manner as its associated minor edge 54. The variation of the distance between the opposed minor edges 54 (and likewise the opposed minor side surfaces 44) need not decrease uniformly from the maximum value D1 to the minimum value d1.

It will be appreciated that whereas the whole of the peripheral edge 50 can function as a cutting edge, in practice, sections of the peripheral edge 50 adjacent the lowered corners 60 will not function as cutting edges. In a accordance with a specific application of the present invention, each given peripheral edge 50 has an effective major cutting edge 66 that extends from an associated given raised corner 58 along the given corner edge 56 and the given major edge 52 for a given major cutting edge length L1, which is greater than one half of the width dimension D1. Additionally, in accordance with the specific application of the present invention, each peripheral edge 50 has an effective minor cutting edge 68 that extends from an associated given raised corner 58 along the given corner edge 56 and the given minor edge 54 for a given minor cutting edge length, L2, which is approximately one half of the length dimension D2 more preferably is slightly greater than one half of D2.

Figure 9:
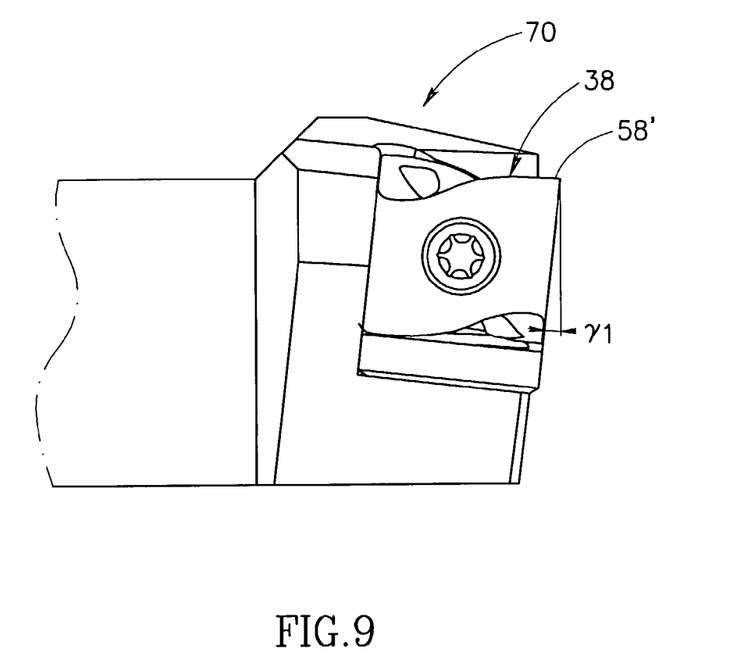
FIG. 9 is a side view of a cutting tool in accordance with the present invention.
Figure 10:
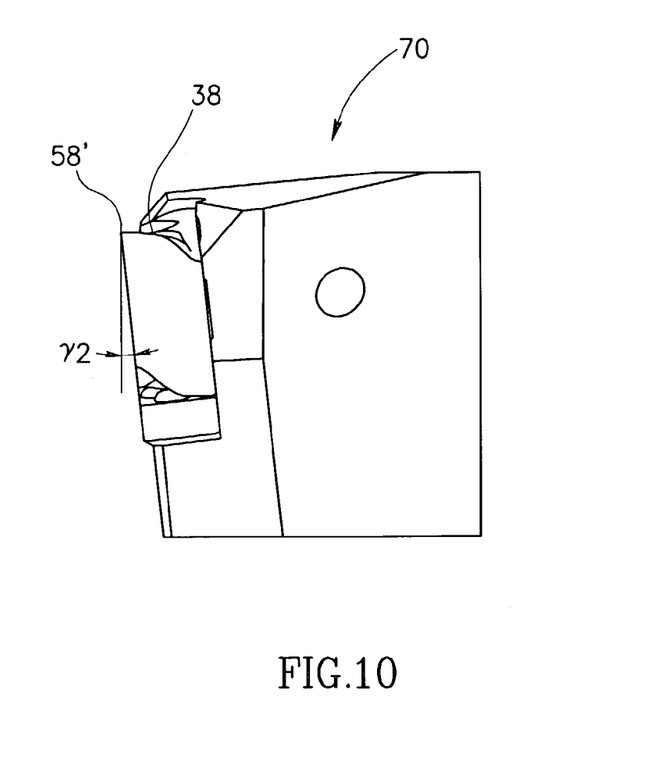
FIG. 10 is an end view of the cutting tool in FIG. 9.

Attention is now drawn to FIGS. 9 and 10, showing side views of a cutting tool 70 in accordance with the present invention. The cutting insert 38 has relief angles γ1, γ2 and presents an operative raised corner 58' outwardly projecting from the cutting tool 70.

Figure 11:
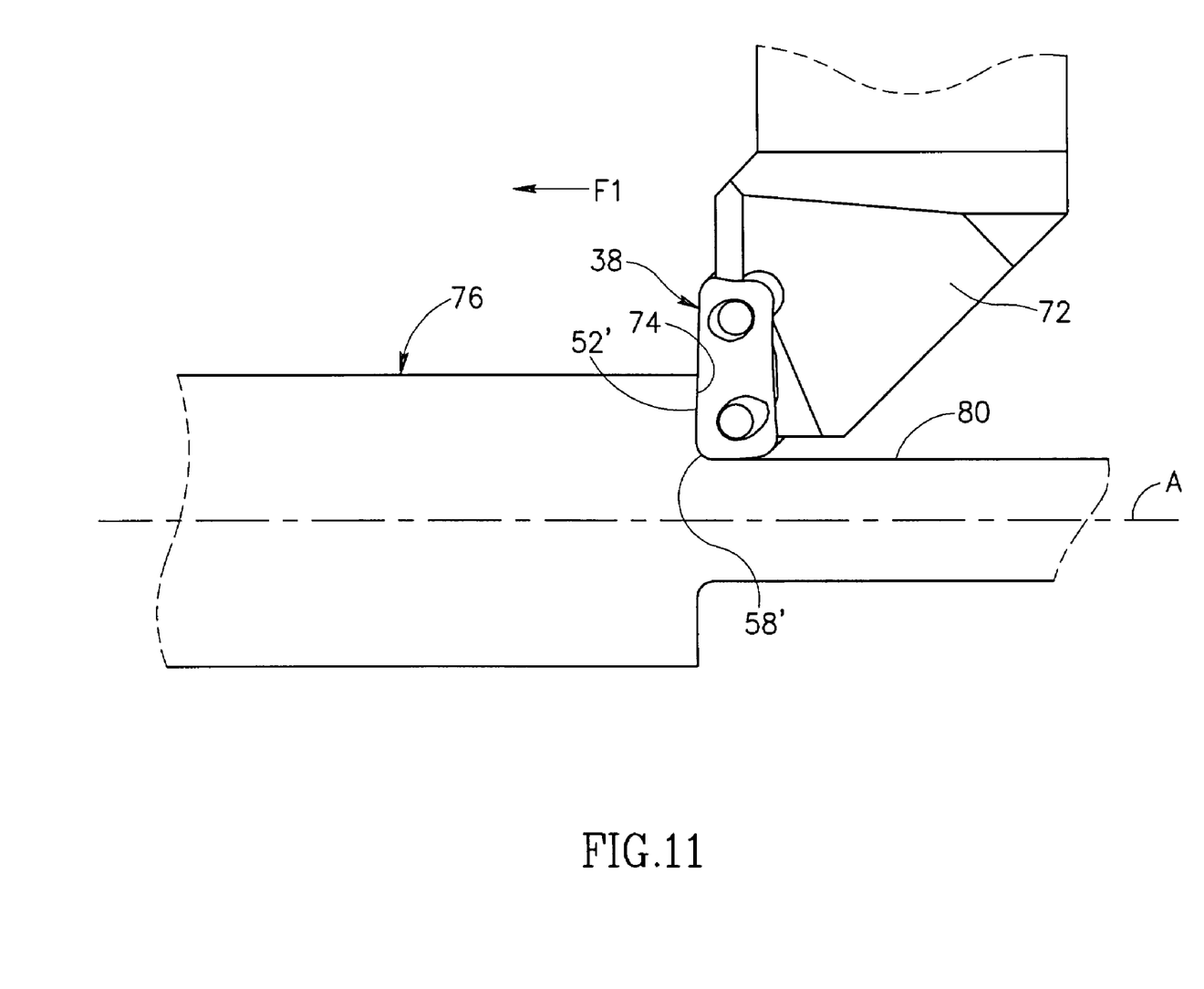
FIG. 11 is a plan view of the cutting tool in accordance with the present invention in an axial turning operation.
Figure 12:
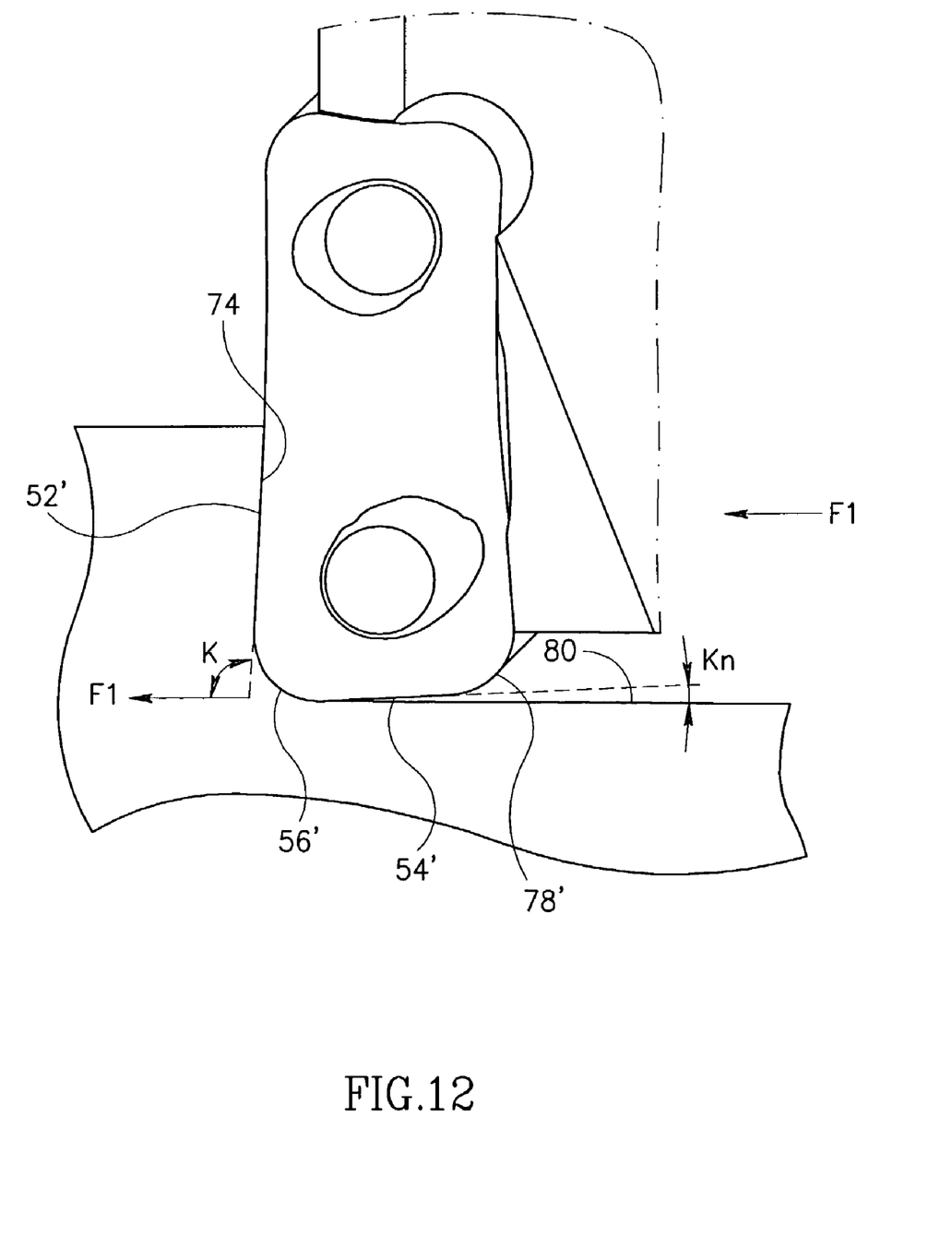
FIG. 12 is a detailed view of FIG. 11.

Attention is now drawn to FIGS. 11 and 12, showing the cutting insert 38 in an insert holder 72 in a plan view during an axial turning operation of a stepped square shoulder 74 of a workpiece 76 rotating about an axis A. Adjacent the stepped square shoulder 74 is an operative major edge 52', an operative corner edge 56' of an operative raised corner 58' an operative minor edge 54', and a trailing lowered corner edge 78'. It will be appreciated that an operative minor edge 54' constitutes a secondary cutting edge or wiper and that only a small section of it adjacent the operative corner edge 56' contacts the workpiece 76. Due to the relief angles γ1, γ2 and any other required orientation of the cutting insert 38, an entering angle K is formed between the major edge 52 and the feed direction F1, and a back clearance angle Kn is formed between the operative minor edge 54' and a cylindrical surface 80 of the workpiece 76. As can be seen, the trailing lowered corner edge 78' is completely relieved from the cylindrical surface 80 of the workpiece 76, whereby the depth of cut for axial turning is unlimited.

Figure 13:
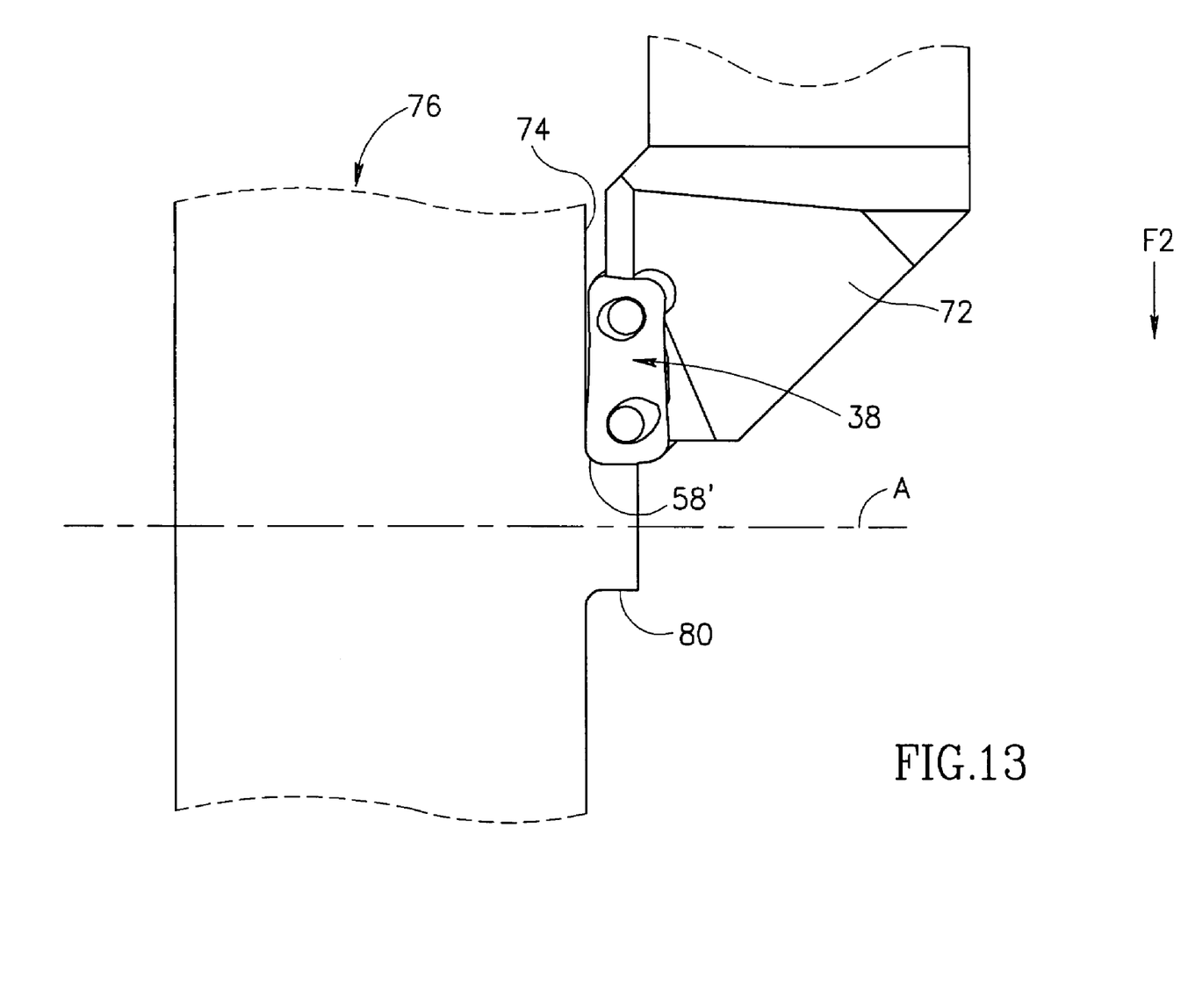
FIG. 13 is a plan view of the cutting tool in accordance with the present invention in a radial turning operation.
Figure 14:
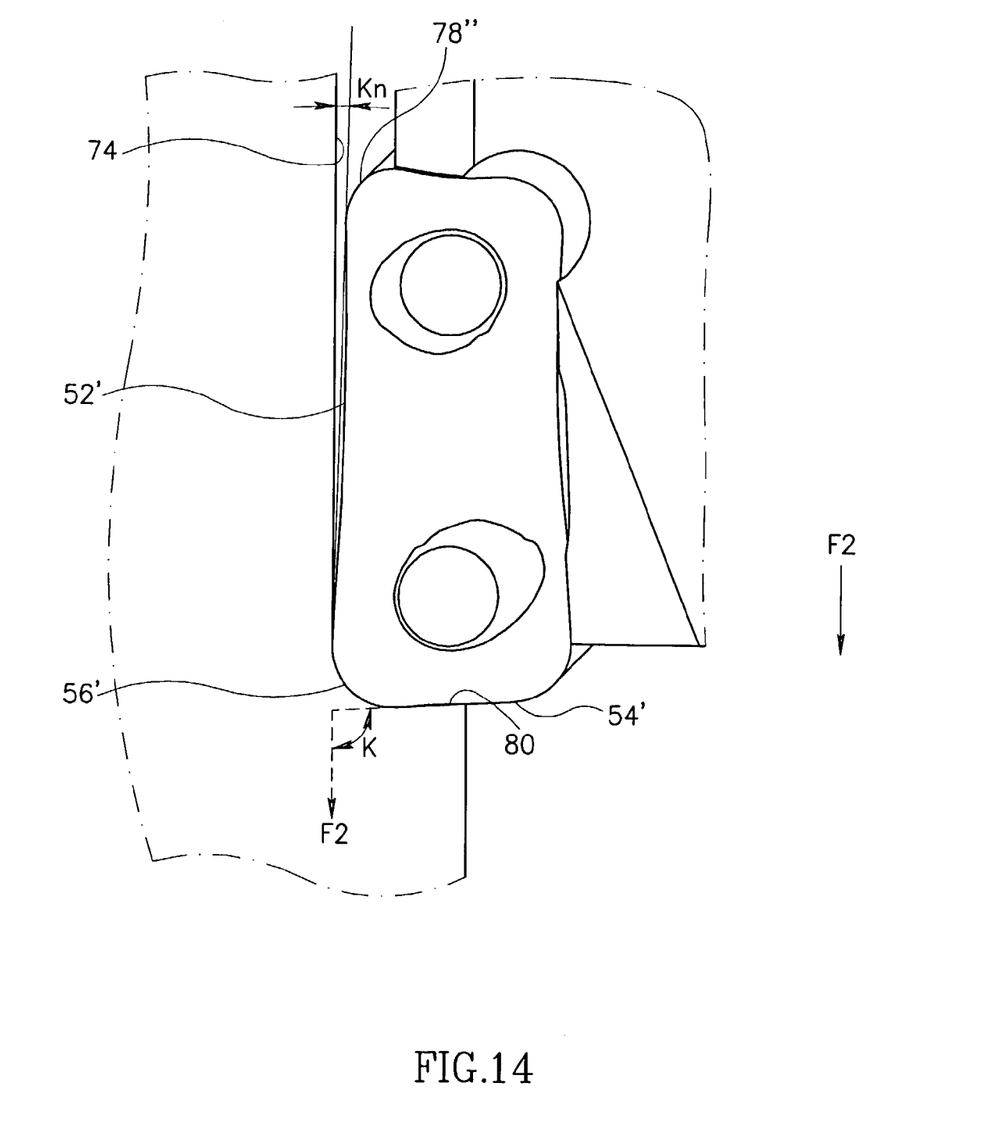
FIG. 14 is a detailed view of FIG. 13.

Attention is now drawn to FIGS. 13 and 14, showing the cutting insert 38 in an insert holder 72 in a plan view during an radial turning operation of a cylindrical surface 80 of a workpiece 76 rotating about an axis A. Adjacent the cylindrical surface 80 is an operative major edge 52', an operative corner edge 56' of the operative corner edge 58' an operative minor edge 54', and a trailing lowered corner edge 78". It will be appreciated that that an operative major edge 52' constitutes a secondary cutting edge or wiper and that only a small section of it adjacent the operative corner edge 56' contacts the workpiece 76. Due to the relief angles γ1, γ2 and any other required orientation of the cutting insert 38, an entering angle K is formed between the operative minor edge 54' and the feed direction F2, and a back clearance angle Kn is formed between the operative major edge 52' and a stepped square shoulder 74 of the workpiece 76. As can be seen, the trailing lowered corner edge 78" is completely relieved from the stepped square shoulder 74 of the workpiece 76, whereby the depth of cut for radial turning is unlimited.

Figure 15:
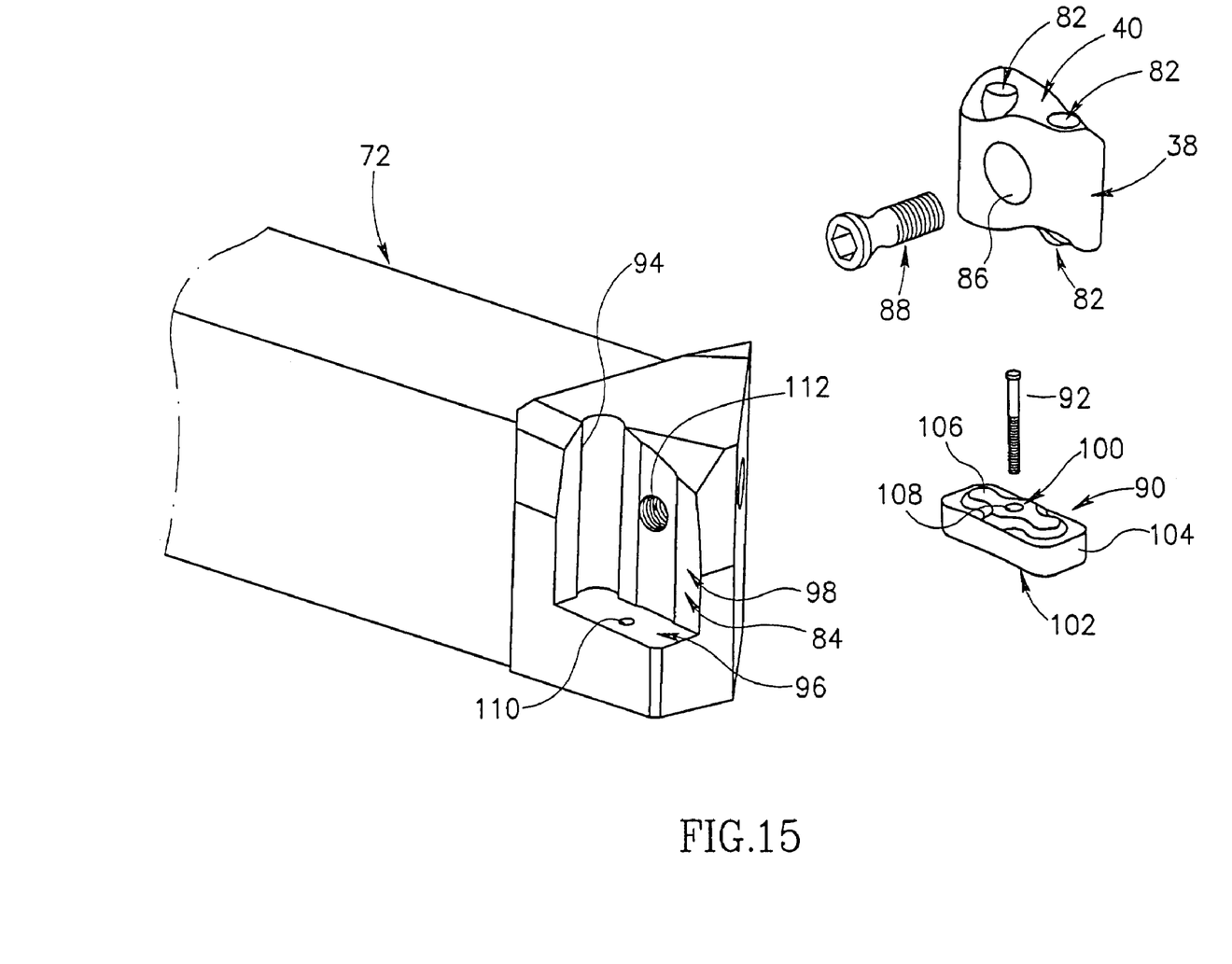
FIG. 15 is a perspective exploded view of cutting tool in accordance with the present invention.

The seating and securing of the cutting insert 38 will now be described with reference to FIG. 15, showing various elements not mentioned above. These elements include two frustums 82 on each end surface 40, an insert pocket 84 of the insert holder 72, an insert through bore 86, a securing screw 88, a shim 90, and a shim screw 92.

The insert pocket 84 comprises first and second side walls 94, 96 uprightly extending from a base surface 98 of the insert pocket 84. The shim 90 comprises a top surface 100, a flat opposing bottom surface 102, and a perimeter surface 104 extending therebetween. The top surface 100 of the shim 90 comprises a raised area 106 extending away from the bottom surface 102 of the shim 90. A shim through bore 108 extends between the top surface 100 and the bottom surface 102. The two frustums 82 of each end surface 40 extend away from the median plane M and are located on either side of the major plane P2. The frustums 82 are likely to impede chip flow, thereby limiting the lengths L1, L2 of the major and minor cutting edges 66, 68.

The shim 90 is secured in the insert pocket 84 with its bottom surface 102 abutting the second side wall 96. The shim screw 92, extends through the shim through bore 108 and threadingly engages with a threaded second bore 110 passing through the second side wall 96, securing the shim 90 to the insert pocket 84. The cutting insert 38 is secured in the insert pocket 84 with a non-operative end surface 40 adjacent the top surface 100 of the shim 90. The first side wall 94 abuts the minor side surface 44 of the cutting insert 38, and the base surface 98 abuts the major side surface 46. The two frustums 82 of a non-operative end surface 40 abut the raised area 106 of the top surface 100 of the shim 90. The securing screw 88 extends through the insert through bore 86 and threadingly engages a threaded receiving bore 112 in the base surface 98 of the insert pocket 84.

It will be appreciated that the particular form of the end surfaces 40 will depend on the design factors that take into account various working conditions. For example, in order to increase the effective cutting wedge angle, a land 114 is provided adjacent the peripheral edge 50 (see FIG. 7). A rake surface 116 slopes downwardly and inwardly from the land 114. If desired the rake surface can be provided with suitable chip control elements.

Figure 16:
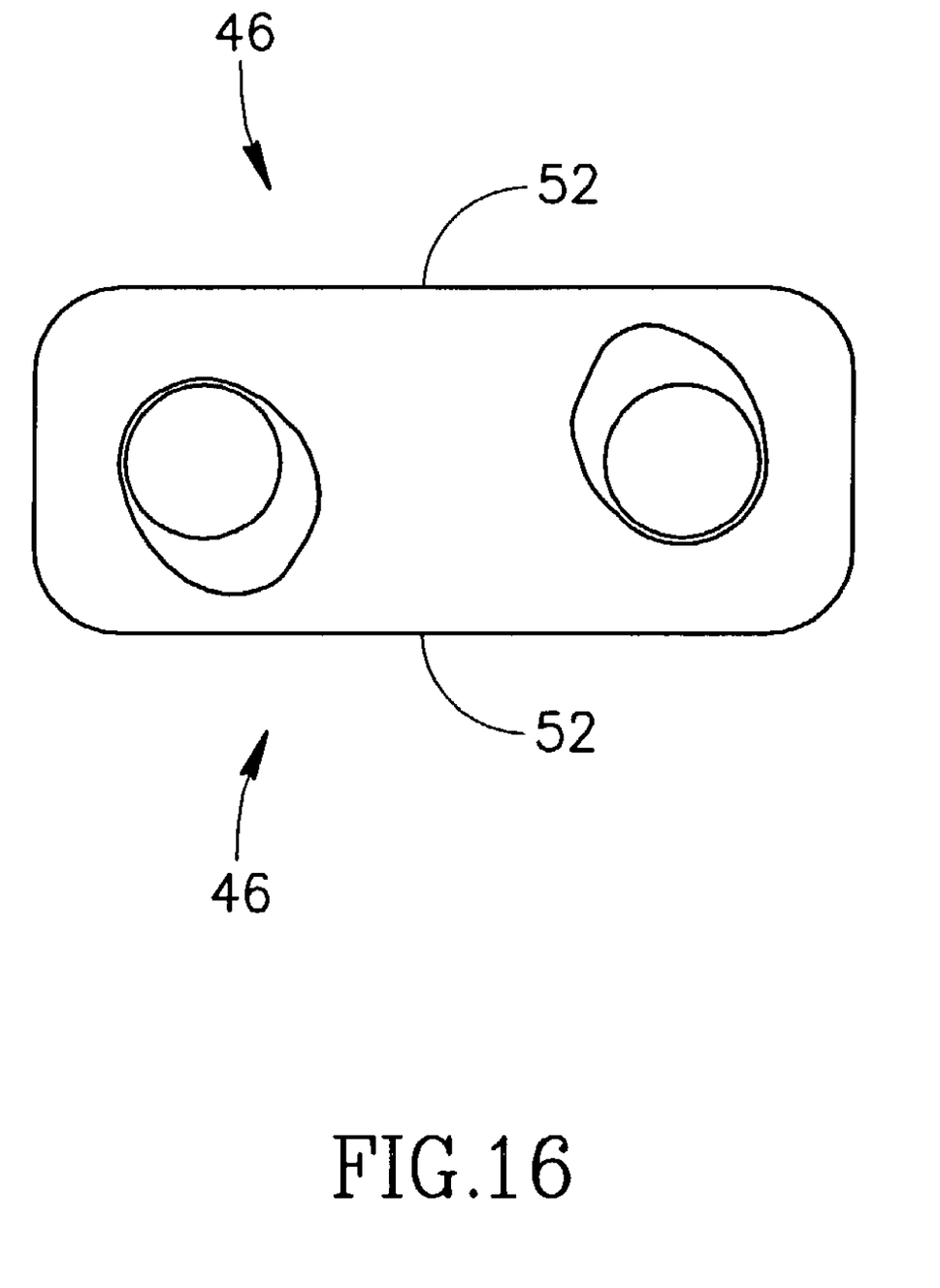
FIG. 16 is an end view of a cutting insert shown insert in accordance with the present invention.

It is advantageous to have recessed side surfaces and side edges to take into consideration manufacturing tolerances so that the sides will not become convex or partially convex, when viewed in an end view, and interfere with the workpiece. It is possible to use straight side edges, i.e., the major side surface 46 and the major edges 52 could be straight, as in FIG. 16, either by tight manufacturing tolerances during pressing and sintering or by additional steps of grinding.

Although the present invention has been described to a certain degree of particularity, it should be understood that various alterations and modifications could be made without departing from the spirit or scope of the invention as hereinafter claimed.

What is claimed is:

1. An indexable cutting insert comprising:
    two identical opposing end surfaces having 180° rotational symmetry about a first axis passing therethrough,
    a peripheral side surface extending between the two opposing end surfaces, and
    a peripheral edge formed at the intersection of each end surface and the peripheral side surface, at least two sections of each peripheral edge constituting cutting edges;
    the peripheral side surface comprising:
    two identical opposing major side surfaces having 180° rotational symmetry about a second axis passing therethrough, the second axis being perpendicular to the first axis; and
    two identical opposing minor side surfaces having 180° rotational symmetry about a third axis passing therethrough, the third axis being perpendicular to the first axis and the second axis;
    a major plane defined by the first axis and the second axis;
    a minor plane defined by the first axis and the third axis;
    a median plane being defined by the second axis and the third axis;
    each end surface having four corners, two lowered corners and two raised corners, the lowered corners being closer to the median plane than the raised corners;
    in a side view of one of the minor side surfaces, all four corners are equidistant from the minor plane;
    in a side view of one of the major side surfaces, all four corners are equidistant from the major plane.

2. An indexable cutting insert according to claim 1 wherein, the cutting insert has a maximum distance D1 between the minor side surfaces that is greater than a maximum distance D2 between the major side surfaces.

3. An indexable cutting insert according to claim 2 wherein, in an end view of the cutting insert, each major side surface is recessed.

4. An indexable cutting insert according to claim 3 wherein, in an end view, the distance between the opposing major side surfaces varies from the maximum distance D2 adjacent the corners of the cutting insert to a minimum distance d2 at the intersection of the major side surfaces with the major plane.

5. An indexable cutting insert according to claim 4 wherein, the minimum distance d2 is given by d2=D2−t, where the value t is given by 0.3 mm$\leq$t$\leq$0.4 mm.

6. An indexable cutting insert according to claim 4 wherein, the distance between the opposing major edges varies from the maximum distance D2 adjacent the corner edges to the minimum distance d2 at the intersection of the major edges with the major plane.

7. An indexable cutting insert according to claim 2 wherein, in an end view of the cutting insert, each minor side surface is recessed.

8. An indexable cutting insert according to claim 7 wherein, in an end view, the distance between the opposing minor side surfaces varies from the maximum distance D1 adjacent the corners of the cutting insert to a minimum distance d1 at the intersection of the minor side surfaces with the minor plane.

9. An indexable cutting insert according to claim 8 wherein, the minimum distance d1 is given by d1=D1−s, where the value s is given by 0.05 mm$\leq$s$\leq$0.25 mm.

10. An indexable cutting insert according to claim 8 wherein, the distance between the opposing minor edges varies from the maximum distance D1 adjacent the corner edges to the minimum distance d1 at the intersection of the minor edges with the minor plane.

11. An indexable cutting insert according to claim 1 wherein, each minor side surface merges with an adjacent major side surface at a corner side surface, wherein each corner side surface extends between a given raised corner of one of the two opposing end surfaces and a given lowered corner of the other of one of the two opposing end surfaces.

12. An indexable cutting insert according to claim 11 wherein, each cutting edge comprises a major edge, a minor edge and a corner edge, therebetween.

13. An indexable cutting insert according to claim 12 wherein, each major edge, corner edge, and minor edge is formed at the intersection of adjacent major side surface, corner side surface, and minor side surface, respectively with an adjacent end surface.

14. An indexable cutting insert according to claim 13 wherein, the major edges are recessed in an end view.

15. An indexable cutting insert according to claim 14 wherein, the distance between the opposing major edges varies from the maximum distance D2 adjacent the corner edges to the minimum distance d2 at the intersection of the major edges with the major plane.

16. An indexable cutting insert according to claim 13 wherein, the minor edges are recessed in an end view.

17. An indexable cutting insert according to claim 16 wherein, the distance between the opposing minor edges varies from the maximum distance D1 adjacent the corner edges to the minimum distance d1 at the intersection of the minor edges with the minor plane.

18. An indexable cutting insert according to claim 13 wherein, each raised corner forms a corner cutting edge and adjacent major and minor edges form major and minor cutting edges, respectively.

19. An indexable cutting insert according to claim 18 wherein, the major cutting edge has a length L1 that is greater than half the distance D1.

20. An indexable cutting insert according to claim 19 wherein, the minor cutting edge has a length L2 that is greater than half the distance D2.

21. An indexable cutting insert according to claim 1 wherein, the cutting insert further comprises an insert through bore extending between the major side surfaces and having a bore axis coinciding with the second axis.

22. A cutting tool comprising:
the cutting insert according to claim 21;
a shim; and
an insert holder having an insert pocket in which the shim and the cutting insert are securely retained.

23. A cutting tool according to claim 22, wherein
the insert pocket comprises a base surface, the base surface being abutted by a given major side surface of the cutting insert, a first side wall extending uprightly from the base surface, the first side wall being abutted by a given minor side surface of the cutting insert, and a second side wall extending uprightly from the base surface, the first side wall being adjacent the major side surface and transverse thereto;
the shim comprises a top surface that is abutted by a non-operative end surface of the cutting insert, an opposing bottom surface that abuts the second side wall, and a perimeter surface extending therebetween;
a shim screw, extending through the shim through bore and threadingly engaged with a threaded second bore of the second side wall, secures the shim to the insert pocket; and
a securing screw, extending through the insert through bore, threadingly engaged with a threaded receiving bore of the base surface, secures the cutting insert to the insert pocket.

24. A cutting tool according to claim 23 wherein:
each end surface of the cutting insert further comprises two frustums which extend away from the median plane, the frustums being located on either side of the major plane;
the top surface of the shim comprises a raised area protruding from the top surface of the shim; and
the two frustums of the non-operative end surface abut the raised area of the top surface of the shim.

* * * * *